(12) United States Patent
Han et al.

(10) Patent No.: US 7,976,902 B2
(45) Date of Patent: Jul. 12, 2011

(54) COATING SOLUTION FOR FORMING INSULATING FILM WITH EXCELLENT CORROSION RESISTANCE PROPERTY AND FILM CLOSE ADHESION PROPERTY AND FILM INTENSITY WITHOUT CHROME AND A METHOD FOR MAKING THE INSULATION FILM ON NON-ORIENTED ELECTRICAL STEEL SHEET BY USING IT

(75) Inventors: Min-Soo Han, Gyeongsangbuk-do (KR); Jung-Woo Kim, Gyeongsangbuk-do (KR); Jae-Kwan Kim, Gyeongsangbuk-do (KR); Seong-Ho Kim, Pohang-si (KR)

(73) Assignee: Posco (KR)

( * ) Notice: Subject to any disclaimer, the term of this patent is extended or adjusted under 35 U.S.C. 154(b) by 336 days.

(21) Appl. No.: 12/375,891

(22) PCT Filed: Jun. 20, 2007

(86) PCT No.: PCT/KR2007/002985
§ 371 (c)(1), (2), (4) Date: Jan. 30, 2009

(87) PCT Pub. No.: WO2008/016220
PCT Pub. Date: Feb. 7, 2008

(65) Prior Publication Data
US 2009/0324837 A1    Dec. 31, 2009

(30) Foreign Application Priority Data

Aug. 2, 2006 (KR) .......... 10-2006-0072830
Aug. 2, 2006 (KR) .......... 10-2006-0072831

(51) Int. Cl.
*B05D 3/02* (2006.01)
(52) U.S. Cl. ........ 427/372.2; 427/385.5; 427/388.1
(58) Field of Classification Search .............. None
See application file for complete search history.

(56) References Cited

U.S. PATENT DOCUMENTS

| | | | | |
|---|---|---|---|---|
| 4,740,393 A | * | 4/1988 | Cody et al. | 427/388.1 |
| 5,658,668 A | * | 8/1997 | Kobayashi et al. | 428/418 |
| 5,945,212 A | * | 8/1999 | Tanaka et al. | 428/327 |

* cited by examiner

*Primary Examiner* — Erma Cameron
(74) *Attorney, Agent, or Firm* — Finnegan, Henderson, Farabow, Garrett & Dunner, LLP

(57) ABSTRACT

There is provided a chromium-free coating composition for forming an insulation film, the composition having excellent corrosion resistance and excellent film adhesion and film strength after stress relief annealing (SRA), including, based on a 100 g phosphate solution having a solid content of 60% by weight, in which monoaluminum phosphate and monozinc phosphate are mixed at a 1:1 ratio: 0.5~5 g of a solid in which cobalt hydroxide and strontium hydroxide are mixed at a 1:1 ratio: 100~300 g of an emulsified polyester resin or an emulsified epoxy resin having a solid content of 20% by weight; 3~10 g of aluminum silicate having a solid content of 20% by weight; and 0.1~6 g of a titanium chelate.

6 Claims, No Drawings

COATING SOLUTION FOR FORMING INSULATING FILM WITH EXCELLENT CORROSION RESISTANCE PROPERTY AND FILM CLOSE ADHESION PROPERTY AND FILM INTENSITY WITHOUT CHROME AND A METHOD FOR MAKING THE INSULATION FILM ON NON-ORIENTED ELECTRICAL STEEL SHEET BY USING IT

TECHNICAL FIELD

The present invention relates to a method of manufacturing a non-oriented electrical steel sheet, and, more particularly, to a chromium-free coating composition for forming an insulation film, having excellent corrosion resistance and excellent film adhesion and film strength after stress relief annealing (SRA), which can exhibit excellent corrosion resistance and film adhesion without the use of chromium at the time of the formation of an insulation film or after the formation of an insulation film, and can improve film characteristics, such as punchability, weldability, adhesivity, lamination factor, appearance, and the like, and to a method of forming an insulation film on a non-oriented electrical steel sheet using the coating composition.

BACKGROUND ART

Generally, non-oriented electrical steel sheets are used for iron cores of motors or generators. These non-oriented electrical steel sheets are classified into electrical steel sheets that require that stress relief annealing (SRA) be performed to improve magnetic properties after punching and electrical steel sheets that do not require SRA to be performed when the costs of heat treatment are excessive in consideration of the increase in magnetic properties due to SRA. With the development of electric appliances, including household electric appliances, the consumption of the non-oriented electrical steel sheets is increasing.

In a process of manufacturing this non-oriented electrical steel sheet, a coating step of forming an insulation film for the interlayer insulation between iron plates is performed in a finishing step. In this case, the insulation film that is formed is required to have basic properties, such as electrical properties for preventing the generation of eddy current, continuous punching workability for preventing the abrasion of a mold when an iron core is fabricated by layering a plurality of steel sheets after punching the steel sheets in a predetermined shape, adhesion resistance for preventing sticking between the steel sheets after SRA of recovering magnetic properties by relieving the stress of the steel sheet, and the like. Further, the coating agent is required to have excellent coating workability and long-term stability after application.

However, as small-sized motors are increasingly used, film characteristics, such as workability, weldability and corrosion resistance, rather than insulation properties, are considered to be important material properties. Recently, since the surface quality of steel sheets has an influence on the properties in use, electrical steel sheets having high surface quality are increasingly required.

Consequently, in order to improve the heat resistance and insulation properties of an insulation film for a non-oriented electrical steel sheet, organic-inorganic composite coating agents, which can make up for the defects of inorganic coating agents, such as phosphate, chromate, and the like, have been developed. Korean Patent Registration Nos. 25106, 31208 and 31219, and U.S. Pat. Nos. 4,316,751 and 4,498, 936 disclose methods of forming an insulation film using the organic-inorganic composite coating agent.

Further, Japanese Examined Patent Publication No. Showa 50-15013 discloses a method of forming an insulation film, in which film characteristics, such as lamination factor, adhesivity, punchability, and the like, can be improved by forming an insulation film using a treatment liquid composed of emulsified organic resins, such as dichromate, vinyl acetate, butadiene-styrene copolymer, acrylic resin, and the like, and good film characteristics can also be realized even after SRA.

However, since the above conventional coating agents essentially include chromium oxides, the use thereof may be limited in the light of the current situation, in which environmental standards are strict.

For this reason, methods of preparing a chromium-free coating agent for an electrical steel sheet have been actively developed. The methods of preparing a chromium-free coating agent for an electrical steel sheet may be classified into methods of introducing phosphate into a coating agent to compensate for the decrease in corrosion resistance and adhesivity due to the absence of chromate, and methods of inducing barrier effects by introducing colloidal silica into a coating agent.

In the method of introducing phosphate into a coating agent, as disclosed in Japanese Unexamined Patent Publication No. 2004-322079, the adhesivity and corrosion resistance of the coating agent are improved using the phosphate formed by mixing aluminum phosphate, calcium phosphate and zinc phosphate at an appropriate ratio. However, when metal phosphates are used, the free phosphoric acid present in the metal phosphates may cause the film to be sticky. Therefore, Japanese Unexamined Patent Publication No. Hei11-131250 and Korean Unexamined Patent Publication No. 1999-26912 disclose methods of adding an organic acid and a silane coupling agent to a coating agent to prevent the free phosphoric acid from sticking.

Meanwhile, as typical examples of the methods of inducing barrier effects by introducing colloidal silica into a coating agent, Korean Unexamined Patent Publication No. 1999-26911 and Japanese Patent No. 3370235 disclose methods of forming an insulation film on a steel sheet, in which the corrosion resistance, adhesivity and smoothness of the insulation film are secured after SRA, using inorganic materials, such as colloidal silica, alumina sol, zirconium oxide, and mixtures thereof, and in which the adhesivity and solvent-resistance thereof are improved by adding a silane coupling agent, etc.

Further, Japanese Patent No. 3320983 discloses an electromagnetic steel sheet on which an insulation film is formed, in which the adhesivity and the corrosion resistance thereof are improved by forming a thin dispersion coating thereon when the surface area ratio of resin and silica is appropriate.

However, the above mentioned chromium-free coating agents, which include phosphate or colloidal silica as a main component, have reached a limit in the alleviation of the stickiness thereof due to phosphate, and in the corrosion resistance thereof due to colloidal silica. Therefore, it is still difficult to broadly apply the technology for completely substituting chromium oxides using these chromium-free coating agents.

Meanwhile, in the case where a non-oriented electrical steel sheet is used for an iron core of a motor or a transformer, the non-oriented electrical steel sheets are punched based on standards, layered, and then welded or adhered, thereby obtaining an iron core.

In this work, if necessary, SRA may be conducted. When this SRA is conducted, particularly, the adhesivity, insulation properties and corrosion resistance after annealing become important.

Generally, an insulation film for a non-oriented electrical steel sheet contains chromium. The chromium is helpful in improving the material properties of the insulation film after SRA.

However, in a chromium-free coating agent, phosphate is used as an alternative material for chromium. In this case, the problem with hygroscopicity caused by a very small amount of free phosphoric acid remaining in the film and the problem with adhesivity in annealing due to the hygroscopicity may occur. Paradoxically, these problems can be solved by the introduction of chromium (refer to Equation 1).

$$CrO_3 + 2H_3PO_4 \rightarrow Cr(PO_4)_2 + 6H_2O \qquad (1)$$

Moreover, in a chromium-free coating agent, since the chromium-free coating agent cannot exhibit the compactness of film formed using the same, due to the peculiar film filling effects of chromium compounds, there is a limit in preventing the deterioration of film characteristics.

DISCLOSURE OF THE INVENTION

Technical Tasks to be Solved by the Invention

Accordingly, the present invention has been made to overcome the above problems occurring in the prior art, and has been made based on the fact that metal phosphates prepared by mixing metal oxides and phosphates at an appropriate molar ratio cause the deterioration of the material properties of a coating composition, particularly, the deterioration of the adhesivity thereof before SRA, based on the fact that phosphates included in a film remain as free phosphoric acid after the drying of the film, and this phosphoric acid absorbs moisture after the formation of the film and thus decreases the corrosion resistance of a coating composition and the film adhesion thereof after stress relief annealing (SRA), and based on the fact that the reason for decreasing the corrosion resistance of a coating composition and the film adhesion thereof after stress relief annealing (SRA) is the compatibility between emulsified organic resin and phosphate, which are the main components of the coating composition.

Therefore, an object of the present invention is to provide a chromium-free coating composition for forming an insulation film on a non-oriented electrical steel sheet, having excellent corrosion resistance and excellent film adhesion and film strength after stress relief annealing (SRA), which is advantageous in the environmental aspect and can exhibit excellent corrosion resistance and film adhesion without the use of chromium at the time of the formation of an insulation film or after the formation of an insulation film by applying an organic-inorganic mixed composition including phosphates, aqueous styrene-acrylic resin or polyester resin, epoxy resin and metal oxides as main components in place of chromium oxide, which is the main component of an insulation coating composition for a non-oriented electrical steel sheet.

Another object of the present invention is to provide a method of forming an insulation film on a non-oriented electrical steel sheet using the chromium-free coating composition.

Technical Solution

In order to accomplish the above object, the present invention provides a chromium-free coating composition for forming an insulation film, the composition having excellent corrosion resistance and excellent film adhesion and film strength after stress relief annealing (SRA), including, based on a 100 g phosphate solution having a solid content of 60% by weight, in which monoaluminum phosphate and monozinc phosphate are mixed at a 1:1 ratio: 0.5~5 g of a solid, in which cobalt hydroxide and strontium hydroxide are mixed at a 1:1 ratio; 100~300 g of an emulsified polyester resin or an emulsified epoxy resin having a solid content of 20% by weight; 3~10 g of aluminum silicate having a solid content of 20% by weight; and 0.1~6 g of a titanium chelate.

Here, the monozinc phosphate has a solid content of 2.75M or 52.5%, the mixed solution of the monoaluminum phosphate and the monozinc phosphate has a solid content of 60% by weight and a viscosity of 30~70 cp, and the emulsified polyester resin has a molecular weight of 40000~50000, a glass transition temperature (Tg) of 40~50° C. and a solid content of 20% by weight.

Further, the monozinc phosphate has a solid content of 2.75M or 52.5%, the mixed solution of the monoaluminum phosphate and the monozinc phosphate has a solid content of 60% by weight and a viscosity of 30~70 cp, and the emulsified epoxy resin has a molecular weight of 10000~20000, a glass transition temperature (Tg) of 50~60° C. and a solid content of 20% by weight.

Further, the titanium chelate is any one selected from among triethanolamine titanate, titanium 2,2,2-nitrilotrisethanolate, and an organic-inorganic porous titanate compound.

Further, the emulsified epoxy resin has a structure in which bisphenol is combined with epoxide, one part of the structure being substituted with an acrylic group, and is thus maintained in an emulsion state.

Further, the present invention provides a method of forming an insulation film on a non-oriented electrical steel sheet using the chromium-free coating composition, including the steps of applying the chromium-free coating composition on the non-oriented electrical steel sheet such that the application amount thereof is in the range of 0.5~6.0 g/m² on each surface of the steel sheet; and heat-treating the applied coating composition at a temperature of 350~700° C. for 10~50 seconds.

Advantageous Effects

According to the present invention, an insulation film having excellent corrosion resistance and excellent film adhesion and film strength after stress relief annealing (SRA) can be formed on a non-oriented electrical steel sheet using a coating composition including a phosphate solution in which monoaluminum phosphate and monozinc phosphate are mixed, a solid in which cobalt hydroxide and strontium hydroxide are mixed, an emulsified polyester resin, aluminum silicate and a titanium chelate.

BEST MODE FOR CARRYING OUT THE INVENTION

Hereinafter, preferred embodiments of the present invention will be described in detail.

Based on the fact that the phosphates included in a film remain as free phosphoric acid after the film has dried, and this free phosphoric acid absorbs moisture after the formation of the film and thus decreases the corrosion resistance of a coating composition and the film adhesion thereof after stress relief annealing (SRA), that is, based on the fact that the reason for decreasing the corrosion resistance of a coating composition and the film adhesion thereof after stress relief annealing (SRA) is the compatibility between emulsified organic resin and phosphate, the present invention provides a coating composition which can overcome the corrosion resistance and adhesion occurring in the case in which the coating composition does not include chromium and can improve the film adhesion after SRA by adding cobalt hydroxide and strontium hydroxide to the phosphate solution, in which monoaluminum phosphate and monozinc phosphate are mixed.

For example, first, a coating composition, including, based on 100 g of the mixed phosphate solution having a solid content of 60% by weight, 100~300 g of an emulsified polyester resin or an emulsified epoxy resin having a solid content of 20% by weight, 3~10 g of aluminum silicate having a solid content of 20% by weight, and 0.1~16 g of a titanium chelate, is prepared, this coating composition is applied on a non-oriented electrical steel sheet such that the application amount thereof is in the range of 0.5~6.0 g/m$^2$ on each surface of the steel sheet, and then the applied coating composition is heat-treated at a temperature of 350~700° C. for 10~30 seconds, thereby forming an insulation film having improved corrosion resistance and film adhesion.

Here, the emulsified polyester resin may have a molecular weight of 40000~50000, a glass transition temperature (Tg) of 40~50° C. and a solid content of 20% by weight. When the amount of the emulsified polyester resin is below 100 g in solid content, the relative fraction of the phosphate is increased, and thus there is a problem in that the stickiness of the coating composition is decreased and powder is precipitated whereas the corrosion resistance of the coating composition is increased. In contrast, when the amount of the emulsified polyester resin is above 300 g in solid content, the corrosion resistance and compatibility of the coating composition are remarkably decreased. Therefore, it is preferred that the emulsified polyester be added in the above range.

Moreover, the emulsified epoxy resin may have a molecular weight of 10000~20000, a glass transition temperature (Tg) of 50~60° C. and a solid content of 20% by weight. Although the emulsified epoxy resin has a structure in which bisphenol is combined with epoxide, one part of the structure may be substituted with an acrylic group such that it is maintained in an emulsion state. When the amount of the emulsified epoxy resin is below 100 g in solid content, the relative fraction of the phosphate is increased, and thus there is a problem in that the stickiness of the coating composition is decreased and powder is precipitated whereas the corrosion resistance of the coating composition is increased. In contrast, when the amount of the emulsified epoxy resin is above 300 g in solid content, the corrosion resistance and compatibility of the coating composition are remarkably decreased. Therefore, it is preferred that the emulsified epoxy be added in the above range.

Further, the aluminum silicate may be aqueous alumina colloidal silica having a solid content of 20% by weight. When the amount of the aluminum silicate is below 3 g in solid content, the film formation property and corrosion resistance of the coating composition are decreased. In contrast, when the amount of the aluminum silicate is above 10 g, the adhesivity of the coating composition before and after SRA is decreased. Therefore, it is preferred that the aluminum silicate be added in the above range.

Further, the titanium chelate serves as a cross-linking agent which is present in a coating composition and connects metal phosphates with polyester resins when the coating composition is dried. When the amount of the titanium chelate is below 0.1 g, the titanium chelate cannot serve as the cross-linking agent. In contrast, when the amount of the titanium chelate is above 6 g, the titanium chelate exhibits the same reaction characteristics. Therefore, it is preferred that the titanium chelate be added in the above range.

To sum up, in the present invention, the corrosion resistance and film adhesion of the coating composition after SRA, which are deteriorated when the coating composition does not chromium oxide, are improved through the following methods.

First, in the present invention, the monoaluminum phosphate ($Al(H_2PO_4)_3$) and monozinc phosphate ($Zn(H_2PO_4)_2$) may be mixed at a 1:1 ratio. Here, cobalt hydroxide and strontium hydroxide are added to this mixed phosphate, so that the heat resistance and compactness of the film are secured, thereby improving the corrosion resistance of the coating composition.

In this case, when the metal phosphates are introduced as a component of the coating composition, since the metal phosphates, as is well known, serve as a binder between the coating composition, composed of inorganic-organic composite compounds, and a steel sheet, which is a substrate, they improve the adhesivity of the coating composition and serve as an film formation agent having excellent heat resistance.

Here, the phosphate, which is used for the coating composition of the present invention, accurately refers to hydrogen phosphate, has dissociable hydrogen atoms, and includes metal having an atomic valence of 2 or 3.

The type of the hydrogen phosphate includes three types of monometal phosphate, dimetal phosphate and trimetal phosphate. In the present invention, the hydrogen phosphate may be a hydrogen phosphate, which is a mixture of monoaluminum phosphate ($Al(H_2PO_4)_3$) and monozinc phosphate ($Zn(H_2PO_4)_2$).

In these phosphate solutions, the monozinc phosphate ($Zn(H_2PO_4)_2$) has a solid content of 2.75M or 52.5%, and the method of preparing monoaluminum phosphate ($Al(H_2PO_4)_3$) is not limited. However, the combination ratio of the monozinc phosphate with the monoaluminum phosphate is closely related to the viscosity of the phosphate solution, which is related to the adhesivity thereof. The viscosity of the phosphate solution depending on the combination ratio thereof is described in Table 1 below.

Further, the phosphoric acid, which is used for preparing the mixed hydrogen phosphate of monoaluminum phosphate ($Al(H_2PO_4)_3$) and monozinc phosphate ($Zn(H_2PO_4)_2$), is not particularly limited either, and may be phosphoric acid within a commonly-used concentration range. However, the final solid content of the mixed solution may be about 60% by weight.

Second, the surface hygroscopicity and stickiness after SRA, occurring when the coating composition including phosphate is used, are overcome by the optimization of the mixing ratio of phosphate and resin and the introduction of cobalt hydroxide and strontium hydroxide.

That is, when the steel sheet is coated using the coating composition including a large amount of phosphate and then time passes, the hygroscopicity, or the formation of powder caused by free phosphoric acid, may occur.

Therefore, in order to decrease the incidence of surface defects caused by free phosphoric acid, pure phosphates and metal oxides must be prepared in an appropriate molar ratio, and the component ratio of phosphate in the coating composition is also very important.

As described above, in the coating composition of the present invention, based on a 100 g phosphate solution (solid content: 60% by weight) in which monoaluminum phosphate and monozinc phosphate are mixed at a 1:1 ratio, about 2% by weight of cobalt hydroxide and strontium hydroxide are basically added to the coating composition.

The reason for adding the cobalt hydroxide and strontium hydroxide to the phosphate solution is that, as shown in the above Equation 1, the cobalt hydroxide and strontium oxide perform the function of suppressing free phosphoric acid, caused by the reaction of chromium oxide and phosphate, and increase the compactness of the film, thus contributing to the improvement of corrosion resistance.

Third, in order to improve the film adhesion after SRA, a titanium chelate was introduced into the coating composition.

Generally, the film strength after SRA is related to the compatibility of an organic resin and a metal phosphate. That is, if the compatibility of the organic resin and metal phosphate is not good immediately after the coating composition is prepared, a phase separation phenomenon or a coagulation phenomenon, which is not visible to the naked eye, may occur.

When a film is formed using the coating composition prepared in this way and then an SRA is performed at a temperature of 750° C. for 2 hours, the phenomenon in which impurities, such as black ash, remain on the surface of samples can be observed. When motors or compressors are fabricated using the final coating composition in which this phenomenon is observed, the cooling oil supply pipe thereof may become blocked and the lifespan thereof may be greatly decreased. Therefore, in the present invention, this problem can be overcome by improving the compatibility of organic resin and metal phosphates, which are the main components of the coating composition, and the adhesion between the coating composition and other materials, using titanium chelate.

Generally, methods of surface-treating an electrical steel sheet are greatly influenced by basis material. In particular, as the amount of silicon is decreased, the adhesivity thereof tends to decrease. This tendency is clearly shown by the peeling strength of the film after SRA.

Meanwhile, chromium oxides are generally used as an agent for treating an insulation film in order to impart film characteristics, such as corrosion resistance, etc., thereto. In this case, there are problems in that this chromium badly influences the human body when an insulation coating solution is prepared using chromium and the prepared insulation coating solution is applied on a substrate in a manufacturing line, in that environmental problems are caused when waste water is discharged, and in that a mold may be abnormally abraded by six valent chromium ions remaining in the insulation film at the time of punching work, and thus the lifespan of the mold may be decreased. Therefore, it is preferred that the chromium oxides be excluded early in the preparation of the insulation coating solution.

Further, in order to prevent the decrease in corrosion resistance and film compactness caused by the exclusion of chromium oxides, in the present invention, metal phosphate is necessarily introduced. An example of the metal phosphate is hydrogen phosphate, which is a mixed type of monoaluminum phosphate ($Al(H_2PO_4)_3$) and monozinc phosphate ($Zn(H_2PO_4)_2$).

In these phosphate solutions, the monozinc phosphate has a solid content of 2.75M or 52.5%, and the method of preparing monoaluminum phosphate is not limited. However, since the combination ratio of the monozinc phosphate and monoaluminum phosphate is closely related to the viscosity of the phosphate solution, which is related to the adhesivity thereof, the final solid content of the mixed solution may be about 60% by weight in order to maintain an appropriate viscosity after the preparation of the phosphate solution.

In this case, in the present invention, various metal phosphates, such as monoaluminum phosphate ($Al(H_2PO_4)_3$), monozinc phosphate ($Zn(H_2PO_4)_2$), monomagnesium phosphate ($Mg(H_2PO_4)_2$), and the like, are variously combined, the combinations thereof are mixed with polyester resins, and then the corrosion resistance test of the mixture is conducted, thereby preparing a mixed phosphate solution in which monoaluminum phosphate and monozinc phosphate are mixed at a ratio of 50/50, that is, 1:1, and which has a viscosity of 30~70 cp. The reason for using this mixed phosphate solution is that it has the best corrosion resistance.

The reason for limiting the viscosity of the mixed phosphate solution as stated above is that the viscosity thereof cannot be suitably maintained when the amount of monoaluminum phosphate ($Al(H_2PO_4)_3$) included in the mixed phosphate solution is relatively high, the mixed phosphate solution exhibits stickiness after drying, and the corrosion resistance thereof is decreased when the amount of monozinc phosphate ($Zn(H_2PO_4)_2$) is relatively high, thereby not obtaining the desired results. Therefore, the viscosity thereof may be in the range of 30~70 cp, and more preferably 50 cp.

However, when the phosphates are used for the coating composition, as described above, there is a problem in that the surface stickiness of the coating composition due to free phosphoric acid is caused, and powder is precipitated.

Accordingly, in the present invention, in order to overcome this problem and to find materials which can take the place of the reaction of chromium oxides and phosphoric acid, as in Equation 1, various metal oxides and hydroxides have been widely applied, and the effects thereof have been verified.

Examples of the found materials include cobalt phosphate hydrate, nickel oxide, strontium peroxide, iron oxide, copper oxide, manganese oxide, cobalt hydroxide, strontium hydroxide, iron citrate hydrate, nickel hydroxide, ammonium ferric citrate, germanium dioxide, niobium oxide, molybdenum oxide, barium oxide, lanthanum oxide, tantalum oxide, yttrium oxide, and the like. It was found in the following Example 1 that, among these materials, cobalt hydroxide and strontium hydroxide improve the precipitation of free phosphoric acid and the compactness of the film. In particular, when cobalt hydroxide and strontium hydroxide are suitably mixed, the surface stickiness of the coating composition and the precipitation of powder can be prevented, and the corrosion resistance thereof can also be improved.

That is, in the present invention, based on a 100 g phosphate solution having a solid content of 60% by weight and a viscosity of 30~70 cp, particularly 50 cp, in which monoaluminum phosphate and monozinc phosphate are mixed at a ratio of 1:1 (50 g/50 g, based on 100 g of the phosphate solution), when 0.5~5 g, preferably about 2 g, of a solid, in which cobalt hydroxide and strontium hydroxide are mixed at a ratio of 1:1, is added to the phosphate solution and dissolved therein, the best efficiency was exhibited.

In this case, the reason for mixing the cobalt hydroxide and the strontium hydroxide at a 1:1 ratio is that the surface stickiness of the coating composition and the precipitation of powder can be prevented and the corrosion resistance thereof can be improved by adding 0.5~5 g, preferably about 2 g, of the solid, in which cobalt hydroxide and strontium hydroxide are mixed at a ratio of 1:1, to the 100 g phosphate solution having a viscosity of 30~70 cp, particularly 50 cp, in which monoaluminum phosphate and monozinc phosphate are mixed at a 1:1 ratio. In this case, when the amount of the cobalt hydroxide is relatively high compared to the amount of the strontium hydroxide, although the corrosion resistance of the coating composition is increased, the viscosity of the metal phosphate is increased, thus decreasing the compatibility with polyester resin, which is another main component of the coating composition. In contrast, when the amount of the strontium hydroxide is relatively high compared to the amount of the cobalt hydroxide, the improvement of corrosion resistance is limited.

Meanwhile, in the case where the main components of the coating composition are phosphate and polyester resin, or phosphate and epoxy resin, the compatibility between the two components may be problematic. When the compatibility between the two components is not good, the fine phase separation phenomenon, which cannot be observed with the naked eye after the preparation of the coating composition, and the coagulation phenomenon between the two components may occur. Further, when the film formed using this coating composition goes through SRA at a temperature of 750° C. for 2 hours, the phenomenon in which impurities, such as black ash, remain on the surface of the sample may occur.

Accordingly, in order to overcome this problem, in the present invention, a titanium chelate is introduced to improve the film adhesivity after SRA. Here, examples of the titanium chelate may include triethanolamine titanate, titanium 2,2,2-nitrilotrisethanolate, organic-inorganic porous titanate compounds, and the like.

For this reason, when the coating composition including metal phosphate and polyester resin is dried, the titanium chelate causes a special reaction between the metal phosphate and the polyester resin, thus forming a very firm film.

This titanium chelate has a structural formula represented by (A) of Equation 2 below, and causes a special chemical reaction, represented by Equation 2, when the polyester resin represented by (B) of Equation 2 is included in the emulsified resin coating composition.

Further, the titanium chelate causes chemical reactions represented by Equations 3 and 4 by reacting the titanium chelate with metal phosphates, which are the main components of the coating composition.

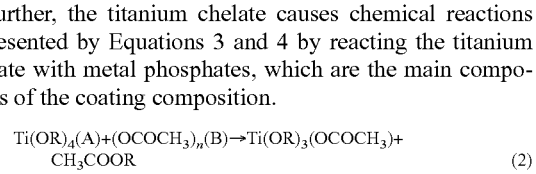

From these series of reactions, represented by Equations 1, 2 and 3, this titanium chelate serves as a cross-linking agent for ultimately connecting the metal phosphate with the polyester resin at the time of drying the coating composition, while existing in the coating composition.

Moreover, the titanium chelate has a structural formula represented by (A) of Equation 2, and causes a special chemical reaction, represented by Equation 5, when the epoxy resin represented by (B) of Equation 5 is included in the coating composition.

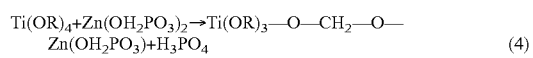

When a film is formed using the coating composition prepared in this way, the film is uniformly and firmly formed, and the phenomenon in which impurities, such as black ash, remain on the surface of the sample even after SRA can be prevented, thus improving the film adhesivity after SRA.

Meanwhile, a method of forming an insulation film according to the present invention includes the steps of applying the coating composition, that is, a treatment liquid, on the non-oriented electrical steel sheet such that the application amount thereof, that is, dry film thickness, is in the range of $0.5~6.0$ g/m$^2$ on each surface of the steel sheet; and heat-treating the applied coating composition at a temperature of 350~700° C. for 10~50 seconds.

Here, when the amount of the coating composition is below 0.5 g/m$^2$, the coating composition insufficiently functions as an insulation coating agent because the insulation property thereof is low. In contrast, when the amount thereof is above 6.0 g/m$^2$, it is difficult to use to form a firm film because the drying of the film is problematic due to the excessive application of the coating composition and the surface of the film is cracked due to the weight of the film itself.

Further, when the drying temperature of the coating composition is below 350° C., the phosphate in the coating composition may not be dried. In contrast, when the drying temperature thereof is above 700° C., the color of the film may be changed due to the deterioration of the organic emulsion in the coating composition. Therefore, it is required that the coating composition be dried in the above temperature range.

Accordingly, an insulation film having excellent adhesivity and corrosion resistance is formed on a non-oriented electrical steel sheet.

Below, the present invention will be described in more detail with reference to an Example.

Example 1

A non-oriented electrical steel sheet including 0.1% by weight of silicon and having a thickness of 0.50 mm and an area of 120×60 mm was used as a sample, and various treatment liquids were applied on the sample in the range of 0.5~6.0 g/m$^2$ using a coating bar.

Subsequently, the sample treated in this way was dried at a temperature of 650° C. for several seconds and was then air-cooled.

Thereafter, in order to evaluate the characteristics of the sample, a stress relief annealing (SRA) process was performed by heat-treating the sample in a 100% N$_2$ gas atmosphere at a temperature of 750° C. for 2 hours, the insulation properties of the sample was evaluated by measuring the current value when a voltage of 0.5 V and a current of 1.0 A were applied under a pressure of 300 PSI, the adhesivity thereof was evaluated by measuring the minimum diameter of the arc on which there was no peeled film when the sample was formed into respective arcs having diameters of 10, 20, and 30 to 100 mm and was then bent at an angle of 180°, and the appearance of film was evaluated by observing striping, gloss, and the like with the naked eye.

Further, the corrosion resistance of the sample was evaluated by checking whether or not the sample rusted when the sample was dipped in a 5% NaCl solution at a temperature of 35° C. for 8 hours. In Example 1, the corrosion resistance of the sample was indicated as "excellent" in the case where the rusted area of the sample was below 5%, "good" in the case where the rusted area thereof was below 20%, "poor" in the case where the rusted area thereof was 20~50%, and "bad" in the case where the rusted area thereof was above 50%.

Further, the film strength of the sample after SRA was evaluated using an image processing method by quantifying, as a percentage, the degree of adhesion of the peeled film to an adhesive tape and the contamination of the adhesive tape occurring when a piece of adhesive tape having a predetermined size was adhered on the film and separated from the film after SRA.

For example, when the film strength of the sample was indicated as 0, it means that the peeled film is not formed on the surface of the film, and when the film strength thereof is indicated as 100, it means that the total area of the adhesive tape is contaminated by the peeled film. Therefore, as the number indicating the film strength thereof increases, this means that the film strength is not good.

Table 1 shows the corrosion resistance of the coating composition depending on the kind of metal phosphate and metal oxide. In order to prepare a chromium-free coating composition, the corrosion resistance and adhesion thereof must be secured through the effective combination of the metal phosphates, and the metal oxides, added in place of chromium, must be able to prevent the sticking of phosphate and the formation of powder of phosphate. Therefore, Table 1 shows the test results for finding the component composition suitable for this chromium-free coating composition.

In this case, the weight ratio of the phosphate solution and the emulsified polyester resin was adjusted to a ratio of 1:2, in which the stability therebetween is best.

a solid, in which cobalt hydroxide and strontium hydroxide were mixed at a ratio of 50:50, is added to a 100 g phosphate solution having a solid content of 60% by weight and a viscosity of 30~70 cp, particularly 50 cp, in which the monoaluminum phosphate ($Al(H_2PO_4)_3$) and the monozinc phosphate ($Zn(H_2PO_4)_2$) are mixed at a ratio of 50:50, is suitable for preventing the surface stickiness caused by phosphate and the precipitation of powder and for improving the corrosion resistance.

Further, from the above Table 1, in order to evaluate the degree of improvement of film adhesion and film strength after SRA using a material, in which about 2 g of a solid, in which cobalt hydroxide and strontium hydroxide are mixed at a ratio of 50:50, is added to a 100 g phosphate solution in which monoaluminum phosphate ($Al(H_2PO_4)_3$) and monozinc phosphate ($Zn(H_2PO_4)_2$) are mixed, the material was prepared by changing the amount of a titanium chelate that is added. Moreover, in order to prevent the stickiness caused by phosphate, the amount of colloidal silica was also changed.

Table 2 shows the coating compositions prepared by changing the amount of the titanium chelate and colloidal silica. The following Table 3 shows the characteristics of the film formed by applying the prepared coating compositions such that the application amount thereof is 2.5 g/m² and then drying them.

TABLE 1

| No. | Class. | Kind of phosphate (100 parts by weight) | Viscosity of phosphate (cp) | Polyester resin (solid weight) | Oxides Kind | Solid weight | Corrosion resistance | stickiness |
|---|---|---|---|---|---|---|---|---|
| 1 | Test example | Al + Zn (7/3) | 100 | 200 | Cobalt hydroxide | 2 | □ | x |
| 2 | Test example | Al + Zn (5/5) | 50 | 200 | Cobalt hydroxide | 2 | Δ | Δ |
| 3 | Test example | Al + Zn (3/7) | 40 | 200 | Cobalt hydroxide | 2 | x | □ |
| 4 | Test example | Al + Zn (7/3) | 100 | 200 | Strontium hydroxide | 2 | x | x |
| 5 | Test example | Al + Zn (5/5) | 50 | 200 | Strontium hydroxide | 2 | □ | Δ |
| 6 | Test example | Al + Zn (3/7) | 40 | 200 | Strontium hydroxide | 2 | x | □ |
| 7 | Test example | Al + Zn (7/3) | 100 | 200 | Co. hy + St. hy (7/3) | 2 | □ | x |
| 8 | Test example | Al + Zn (5/5) | 50 | 200 | Co. hy + St. hy (7/3) | 2 | □ | ○ |
| 9 | Test example | Al + Zn (3/7) | 40 | 200 | Co. hy + St. hy (7/3) | 2 | □ | Δ |
| 10 | Test example | Al + Zn (7/3) | 100 | 200 | Co. hy + St. hy 5/5 | 2 | □ | Δ |
| 11 | Test example | Al + Zn (5/5) | 50 | 200 | Co. hy + St. hy 5/5 | 2 | ○ | ○ |
| 12 | Test example | Al + Zn (3/7) | 40 | 200 | Co. hy + St. hy (5/5) | 2 | x | □ |
| 13 | Test example | Al + Zn (7/3) | 100 | 200 | Co. hy + St. hy (3/7) | 2 | □ | x |
| 14 | Test example | Al + Zn (5/5) | 50 | 200 | Co. hy + St. hy (3/7) | 2 | □ | Δ |
| 15 | Test example | Al + Zn (3/7) | 40 | 200 | Co. hy + St. hy (3/7) | 2 | x | Δ |
| 16 | Comparative example | Cr type Coating composition | — | — | — | — | ● | ● |

[Evaluation of material properties/excellent: ●, good: ○, ordinary: Δ, poor: □, bad: x]
(Here, Co. hy + St. hy means the sum of cobalt hydroxide and strontium hydroxide)

As given in Table 1, as the result of evaluating the corrosion resistance of test samples by mixing monoaluminum phosphate ($Al(H_2PO_4)_3$) and monozinc phosphate ($Zn(H_2PO_4)_2$), it could be seen that the test example 11, in which about 2 g of

TABLE 2

| No. | Class. | Kind of phosphate (100 parts by weight) | Viscosity of phosphate (cp) | Polyester resin (solid weight) | Oxides Kind | Solid weight | Ti chelate | Al—Si |
|---|---|---|---|---|---|---|---|---|
| 11-1 | Test example | Al + Zn (5/5) | 50 | 200 | Co. hy + St. hy (5/5) | 2 | 0.05 | — |
| 11-2 | Test example | Al + Zn (5/5) | 50 | 200 | Co. hy + St. hy (5/5) | 2 | 0.1 | — |
| 11-3 | Test example | Al + Zn (5/5) | 50 | 200 | Co. hy + St. hy (5/5) | 2 | 0.5 | — |
| 11-4 | Test example | Al + Zn (5/5) | 50 | 200 | Co. hy + St. hy (5/5) | 2 | 1 | — |
| 11-5 | Test example | Al + Zn (5/5) | 50 | 200 | Co. hy + St. hy (5/5) | 2 | 5 | — |
| 11-6 | Test example | Al + Zn (5/5) | 50 | 200 | Co. hy + St. hy (5/5) | 2 | 8 | — |
| 11-7 | Test example | Al + Zn (5/5) | 50 | 200 | Co. hy + St. hy (5/5) | 2 | 0.05 | 0.5 |
| 11-8 | Test example | Al + Zn (5/5) | 50 | 200 | Co. hy + St. hy (5/5) | 2 | 0.1 | 1 |
| 11-9 | Test example | Al + Zn (5/5) | 50 | 200 | Co. hy + St. hy (5/5) | 2 | 0.5 | 3 |
| 11-10 | Test example | Al + Zn (5/5) | 50 | 200 | Co. hy + St. hy (5/5) | 2 | 1 | 5 |

Particularly, Table 3 shows the change in the corrosion resistance and film characteristics of the test samples in the case where 200 g of the emulsified polyester resin having a solid content of 20% by weight is added to a 100 g phosphate solution having a solid content of 60% by weight, in which the monoaluminum phosphate ($Al(H_2PO_4)_3$) and the monozinc phosphate ($Zn(H_2PO_4)_2$) are mixed and the cobalt hydroxide and strontium hydroxide are added, and then 0.5~5.0 g of aluminum silicate and 0.05~8.0 g of a titanium chelate are added thereto by changing the amount thereof.

TABLE 3

| No. | Class. | Corrosion resistance | Water drop test | Adhesivity (mmφ) Before SRA | Adhesivity (mmφ) After SRA | Film strength (%) | Insulation property (mmA) |
|---|---|---|---|---|---|---|---|
| 11-1 | Test example | ○ | ○ | 20 | 40 | 25 | 680 |
| 11-2 | Test example | ○ | ○ | 20 | 30 | 21 | 690 |
| 11-3 | Test example | ○ | ○ | 20 | 30 | 23 | 675 |
| 11-4 | Test example | ○ | ○ | 20 | 30 | 20 | 687 |
| 11-5 | Test example | ○ | ○ | 20 | 30 | 17 | 690 |
| 11-6 | Test example | ○ | ○ | 20 | 30 | 18 | 698 |
| 11-7 | Test example | ○ | ○ | 20 | 30 | 15 | 670 |
| 11-8 | Test example | ● | ○ | 20 | 20 | 7 | 650 |
| 11-9 | Test example | ● | ○ | 20 | 20 | 5 | 630 |
| 11-10 | Test example | ○ | ○ | 30 | 40 | 28 | 650 |
| 16 | Comparative example Cr-type | ● | ○ | 20 | 30 | 12 | 850 |

[Evaluation of material properties/excellent: ●, good: ○, ordinary: Δ, poor: □, bad: x]

As given in the above Table 3, it was found that the test examples 11-8 and 11-9, in which 1.0~3.0 g of aluminum silicate and 0.1~0.5 g of a titanium chelate are added to a 100 g phosphate solution having a solid content of 60% by weight, in which the monoaluminum phosphate ($Al(H_2PO_4)_3$) and the monozinc phosphate ($Zn(H_2PO_4)_2$) are mixed and the cobalt hydroxide and strontium hydroxide are added thereto, have improved corrosion resistance and film adhesion. Further, it was found that the test examples 11-8 and 11-9 have equal or better corrosion resistance and film adhesion than conventional chromium-containing coating compositions.

Further, in order to evaluate the characteristics of the coating composition when epoxy resin was used for the coating composition, Table 4 shows the coating compositions prepared by changing the amount of a titanium chelate and colloidal silica when about 2 g of a solid, in which cobalt hydroxide and strontium hydroxide are mixed at a ratio of 50:50, was added to a 100 g phosphate solution having a solid content of 60% by weight and a viscosity of 30~70 cp, particularly 55 cp, in which the monoaluminum phosphate ($Al(H_2PO_4)_3$) and the monozinc phosphate ($Zn(H_2PO_4)_2$) are mixed at a ratio of 50:50. In this case, the weight ratio of the phosphate solution and epoxy resin was adjusted to a ratio of 1:2.1 in the aspect of stability. Table 5 shows the characteristics of the film formed by applying the prepared coating compositions such that the application amount thereof is 2.5 g/m² and then drying them.

TABLE 4

| No. | Class. | Kind of phosphate (100 parts by weight) | Viscosity of phosphate (cp) | Polyester resin (solid weight) | Oxides Kind | Oxides Solid weight | Ti chelate | Al—Si |
|---|---|---|---|---|---|---|---|---|
| 11-1' | Test example | Al + Zn (5/5) | 55 | 85 | Co. hy + St. hy (5/5) | 2 | 0.05 | — |
| 11-2' | Test example | Al + Zn (5/5) | 55 | 85 | Co. hy + St. hy (5/5) | 2 | 0.1 | — |
| 11-3' | Test example | Al + Zn (5/5) | 55 | 85 | Co. hy + St. hy (5/5) | 2 | 0.5 | — |
| 11-4' | Test example | Al + Zn (5/5) | 55 | 85 | Co. hy + St. hy (5/5) | 2 | 1 | — |
| 11-5' | Test example | Al + Zn (5/5) | 55 | 85 | Co. hy + St. hy (5/5) | 2 | 5 | — |
| 11-6' | Test example | Al + Zn (5/5) | 55 | 85 | Co. hy + St. hy (5/5) | 2 | 8 | — |
| 11-7' | Test example | Al + Zn (5/5) | 55 | 85 | Co. hy + St. hy (5/5) | 2 | 0.05 | 0.5 |
| 11-8' | Test example | Al + Zn (5/5) | 55 | 85 | Co. hy + St. hy (5/5) | 2 | 0.1 | 1 |
| 11-9' | Test example | Al + Zn (5/5) | 55 | 85 | Co. hy + St. hy (5/5) | 2 | 0.5 | 3 |
| 11-10' | Test example | Al + Zn (5/5) | 55 | 85 | Co. hy + St. hy (5/5) | 2 | 1 | 5 |

(Here, Co. hy + St. hy means the sum of cobalt hydroxide and strontium hydroxide)

Particularly, Table 5 shows the change in the corrosion resistance and film characteristics of the test samples in the case where 210 g of the emulsified polyester resin having a solid content of 20% by weight is added to a 100 g phosphate solution having a solid content of 60% by weight, in which the monoaluminum phosphate ($Al(H_2PO_4)_3$) and the monozinc phosphate ($Zn(H_2PO_4)_2$) are mixed and the cobalt hydroxide and strontium hydroxide are added, and then 0.5~5.0 g of aluminum silicate and 0.05~8.0 g of a titanium chelate are added thereto by changing the amount thereof.

As given in Table 5, it was found that the test examples 11-8' and 11-9', in which 1.0~3.0 g of aluminum silicate and 0.1~0.5 g of a titanium chelate are added to a 100 g phosphate solution having a solid content of 60% by weight, in which the monoaluminum phosphate ($Al(H_2PO_4)_3$) and the monozinc phosphate ($Zn(H_2PO_4)_2$) are mixed and the cobalt hydroxide and strontium hydroxide are added thereto, have improved corrosion resistance and film adhesion. Further, it was found that the test examples 11-8' and 11-9' have equal or better

TABLE 5

| No. | Class. | Water Corrosion resistance | drop test | Adhesivity (mmφ) Before SRA | Adhesivity (mmφ) After SRA | Film strength (%) | Insulation property (mmA) |
|---|---|---|---|---|---|---|---|
| 11-1' | Test example | ○ | ○ | 20 | 40 | 27 | 684 |
| 11-2' | Test example | ○ | ○ | 20 | 30 | 23 | 695 |
| 11-3' | Test example | ○ | ○ | 20 | 30 | 25 | 681 |
| 11-4' | Test example | ○ | ○ | 20 | 30 | 22 | 670 |
| 11-5' | Test example | ○ | ○ | 20 | 30 | 19 | 685 |
| 11-6' | Test example | ○ | ○ | 20 | 30 | 17 | 702 |
| 11-7' | Test example | ○ | ○ | 20 | 30 | 16 | 650 |
| 11-8' | Test example | ● | ○ | 20 | 20 | 9 | 630 |
| 11-9' | Test example | ● | ○ | 20 | 20 | 8 | 620 |
| 11-10' | Test example | ○ | ○ | 30 | 40 | 30 | 630 |
| 16 | Comparative example Cr-type | ● | ○ | 20 | 30 | 12 | 850 |

[Evaluation of material properties/excellent: ●, good: ○, ordinary: Δ, poor: □, bad: x]

corrosion resistance and film adhesion than conventional chromium-containing coating compositions.

INDUSTRIAL APPLICABILITY

The present invention provides a coating composition for forming an excellent insulation film on a non-oriented electrical steel sheet, which is used for motors and generators, and a method of forming an insulation film using the coating composition. Therefore, the coating composition according to the present invention can be widely utilized in related industries.

The invention claimed is:

1. A chromium-free coating composition for forming an insulation film, the composition having excellent corrosion resistance, film adhesion and film strength after stress relief annealing (SRA), comprising, based on a 100 g phosphate solution having a solid content of 60% by weight, in which monoaluminum phosphate and monozinc phosphate are mixed at a 1:1 ratio:
    0.5~5 g of a solid, in which cobalt hydroxide and strontium hydroxide are mixed at a 1:1 ratio;
    100~300 g of an emulsified polyester resin or an emulsified epoxy resin having a solid content of 20% by weight;
    3~10 g of aluminum silicate having a solid content of 20% by weight; and
    0.1~6 g of a titanium chelate.

2. The chromium-free coating composition for forming an insulation film according to claim 1, wherein:
    the monozinc phosphate has a solid content of 2.75M or 52.5%;
    the mixed solution of the monoaluminum phosphate and the monozinc phosphate has a solid content of 60% by weight and a viscosity of 30~70 cp; and
    the emulsified polyester resin has a molecular weight of 40000~50000, a glass transition temperature (Tg) of 40~50° C. and a solid content of 20% by weight.

3. The chromium-free coating composition for forming an insulation film according to claim 1, wherein:
    the monozinc phosphate has a solid content of 2.75M or 52.5%,
    the mixed solution of the monoaluminum phosphate and the monozinc phosphate has a solid content of 60% by weight and a viscosity of 30~70 cp, and
    the emulsified epoxy resin has a molecular weight of 10000~20000, a glass transition temperature (Tg) of 50~60° C. and a solid content of 20% by weight.

4. The chromium-free coating composition for forming an insulation film according to claim 1, wherein the titanium chelate is any one selected from among triethanolamine titanate, titanium 2,2,2-nitrilotrisethanolate, and an organic-inorganic porous titanate compound.

5. The chromium-free coating composition for forming an insulation film according to claim 1, wherein the emulsified epoxy resin has a structure in which bisphenol is combined with epoxide, one part of the structure being substituted with an acrylic group, and is thus maintained in an emulsion state.

6. A method of forming an insulation film on a non-oriented electrical steel sheet using the chromium-free coating composition according to any one of claims 1 to 5, comprising:
    applying the chromium-free coating composition on the non-oriented electrical steel sheet such that an application amount thereof is in a range of 0.5~6.0 g/m$^2$ on each surface of the steel sheet; and
    heat-treating the applied coating composition at a temperature of 350~700° C. for 10~50 seconds.

* * * * *